(12) United States Patent
Agrawal et al.

(10) Patent No.: US 7,437,164 B2
(45) Date of Patent: Oct. 14, 2008

(54) SOFT HANDOFF FOR REVERSE LINK IN A WIRELESS COMMUNICATION SYSTEM WITH FREQUENCY REUSE

(75) Inventors: Avneesh Agrawal, San Diego, CA (US); Edward Harrison Teague, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 10/969,158

(22) Filed: Oct. 20, 2004

(65) Prior Publication Data

US 2005/0271012 A1 Dec. 8, 2005

Related U.S. Application Data

(60) Provisional application No. 60/578,213, filed on Jun. 8, 2004.

(51) Int. Cl.
*H04Q 7/20* (2006.01)
(52) U.S. Cl. .............. 455/446; 455/450; 370/330; 370/331; 370/329; 370/341
(58) Field of Classification Search ......... 370/310–350; 455/447, 442, 452.1, 444–446, 450
See application file for complete search history.

(56) References Cited

U.S. PATENT DOCUMENTS

| 5,625,876 | A | 4/1997 | Gilhousen et al. |
| 5,649,292 | A | 7/1997 | Doner |
| 6,014,412 | A * | 1/2000 | Wiese et al. ............... 375/346 |
| 6,512,752 | B1 * | 1/2003 | H'mimy et al. ............ 370/329 |
| 6,760,438 | B1 * | 7/2004 | Hui et al. .................... 380/28 |

(Continued)

FOREIGN PATENT DOCUMENTS

RU 2120184 10/1998

OTHER PUBLICATIONS

International Search Report - PCT/US05/020180, International Search Authority - European Patent Office, Oct. 13, 2005.

*Primary Examiner*—Charles N Appiah
*Assistant Examiner*—Amancio González
(74) *Attorney, Agent, or Firm*—Thomas R. Rouse; Sandip (Micky) Minhas; Darren M. Simon

(57) ABSTRACT

For soft handoff on the reverse link with restrictive reuse, a wireless terminal searches for pilots transmitted by sectors in a wireless system, measures the detected pilots, selects a serving sector (e.g., the strongest received sector), and identifies non-serving sectors that may receive high interference from the terminal. The serving sector assigns the terminal with subband(s) that are usable by the serving sector and unusable by the non-serving sectors. The terminal transmits data symbols on the assigned subbands to the serving and non-serving sectors. These sectors process the reverse link transmission from the terminal and obtain soft-decision symbols, which are estimates of the transmitted data symbols. The soft-decision symbols from co-located sectors may be combined and then decoded to obtain decoded packets. The sectors may also independently decode the soft-decision symbols, and the decoded packets from these sectors may be combined to obtain final decoded packets for the terminal.

68 Claims, 8 Drawing Sheets

U.S. PATENT DOCUMENTS 7,006,823 B2 * 2/2006 Shurvinton et al. ...... 455/422.1
7,069,009 B2 * 6/2006 Li et al. ...................... 455/446

2003/0227889 A1 12/2003 Wu et al.

* cited by examiner

SOFT HANDOFF FOR REVERSE LINK IN A WIRELESS COMMUNICATION SYSTEM WITH FREQUENCY REUSE

CROSS-REFERENCE TO RELATED APPLICATION

This application claims priority to U.S. Provisional Patent Application Ser. No. 60/578,213, filed Jun. 8, 2004, which is incorporated herein by reference in their entirety.

BACKGROUND

I. Field

The present invention relates generally to communication, and more specifically to data transmission in a wireless multiple-access communication system.

II. Background

A wireless multiple-access system can concurrently support communication for multiple wireless terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This may be achieved by multiplexing the data transmissions on each link to be orthogonal to one another in time, frequency, and/or code domain. The orthogonality ensures that the data transmission for each terminal does not interfere with the data transmissions for other terminals.

A multiple-access system typically has many cells, where the term "cell" can refer to a base station and/or its coverage area depending on the context in which the term is used. The coverage area of a base station may also be partitioned into multiple sectors. Data transmissions for terminals in the same cell may be sent using orthogonal multiplexing to avoid "intra-cell" interference. However, data transmissions for terminals in different cells may not be orthogonalized, in which case each terminal would observe "inter-cell" interference from other cells. The inter-cell interference may significantly degrade performance for certain disadvantaged terminals observing high levels of interference.

To combat inter-cell interference, a multiple-access system may employ a frequency reuse scheme whereby not all frequency bands or subbands available in the system are used in each cell. As an example, cells that are adjacent to each other may use different frequency bands, and the same frequency bands may be reused only by non-adjacent cells. The inter-cell interference observed in each cell with frequency reuse is reduced relative to the case in which all cells use the same frequency bands.

The operating environment for a wireless terminal may change over time due to various factors such as, e.g., movement by the terminal across cells, fading, multipath, interference effects, and so on. Handoff is a useful technique for maintaining good channel conditions for terminals on the edge of cell coverage. Some conventional systems, such as a Time Division Multiple Access (TDMA) system, support "hard" handoff whereby a terminal first breaks away from a current serving base station and then switches to a new serving base station. Hard handoff can provide switched-cell diversity against path-loss and shadowing at the cost of a brief interruption in data transmission. A Code Division Multiple Access (CDMA) system supports "soft" and "softer" handoffs, which allow a terminal to simultaneously communicate with multiple cells (for soft handoff) or multiple sectors (for softer handoff). Soft and softer handoffs can provide additional mitigation against fast fading.

Implementation of soft and softer handoffs is complicated by frequency reuse because not all frequency bands/subbands are available for use in each cell. There is therefore a need in the art for techniques to support soft handoff with frequency reuse.

SUMMARY

Techniques for transmitting data on the reverse link with soft/softer handoff and "restrictive reuse" are described herein. In an embodiment of restrictive reuse, each sector is assigned (1) a "usable" set of frequency subbands that may be allocated to terminals in communication with that sector and (2) a "forbidden" set of frequency subbands that is unusable by the terminals in communication with the sector. For simplicity, in the following description, the term "soft handoff" generically refers to both soft handoff with multiple cells and softer handoff with multiple sectors.

In an embodiment of soft handoff with restrictive reuse, a wireless terminal searches for pilots transmitted by sectors in the system, measures the detected pilots, and identifies strongly received sectors. The terminal selects a "serving" sector (e.g., the strongest received sector) to communicate with and also identifies non-serving sectors that may receive high interference from the terminal on the reverse link. The serving sector determines a "restricted" set of frequency subbands, which may be allocated to the terminal, based on the usable set for the serving sector and the forbidden set for each non-serving sector. The serving sector then assigns one or more subbands from the restricted set to the terminal and sends the subband assignment to the terminal as well as the non-serving sectors. The terminal receives the subband assignment, processes (e.g., encodes and modulates) traffic/packet data to generate data symbols, multiplexes the data symbols onto the assigned subbands, and generates and transmits a reverse link signal to the sectors.

The serving and non-serving sectors receive the reverse link signal from the terminal. Each sector processes (e.g., demodulates) its received signal to obtain soft-decision symbols, which are estimates of the data symbols transmitted by the terminal. The soft-decision symbols obtained by sectors that are co-located (described below) may be combined and then decoded to obtain decoded packets for the terminal. The soft-decision symbols obtained by sectors that are not co-located may be independently decoded, and the decoded packets from these sectors may be selectively combined to obtain final decoded packets for the terminal.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
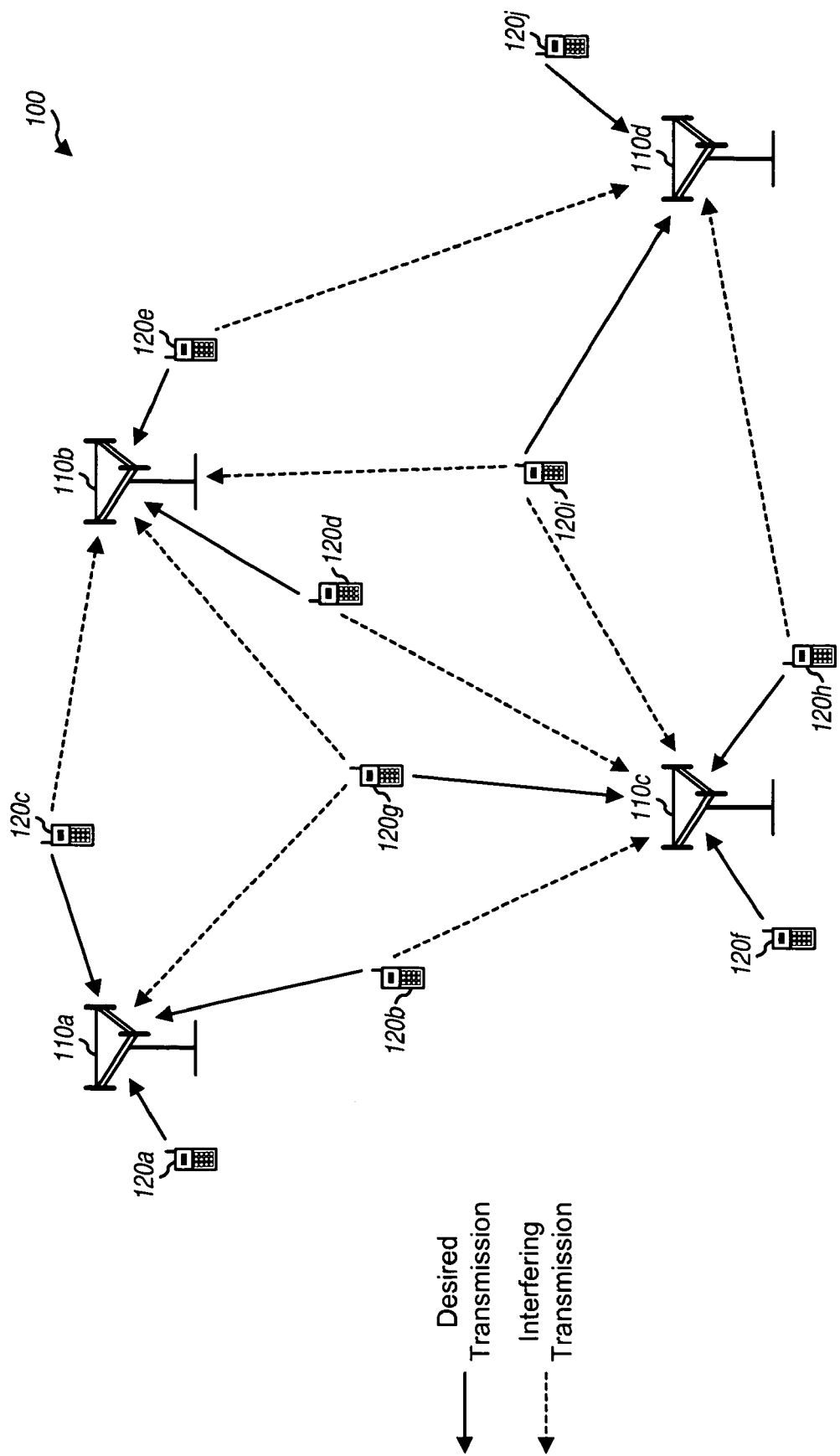
FIG. 1 shows a wireless multiple-access communication system.

FIG. 1 shows a wireless multiple-access communication system 100. System 100 includes a number of base stations 110 that support communication for a number of wireless terminals 120. A base station is a fixed station used for communicating with the terminals and may also be called an access point, a Node B, or some other terminology. Terminals 120 are typically dispersed throughout the system, and each terminal may be fixed or mobile. A terminal may also be called a mobile station, a user equipment (UE), a wireless communication device, a subscriber unit, a handset, or some other terminology. Each terminal may communicate with one or possibly multiple base stations on the forward and reverse links at any given moment. For simplicity, FIG. 1 only shows data transmission on the reverse link. A reverse link transmission from a given terminal to a given base station (shown by solid lines) may also be received by other base stations (shown by dashed lines) and represent interference to these other base stations.

Figure 2A:
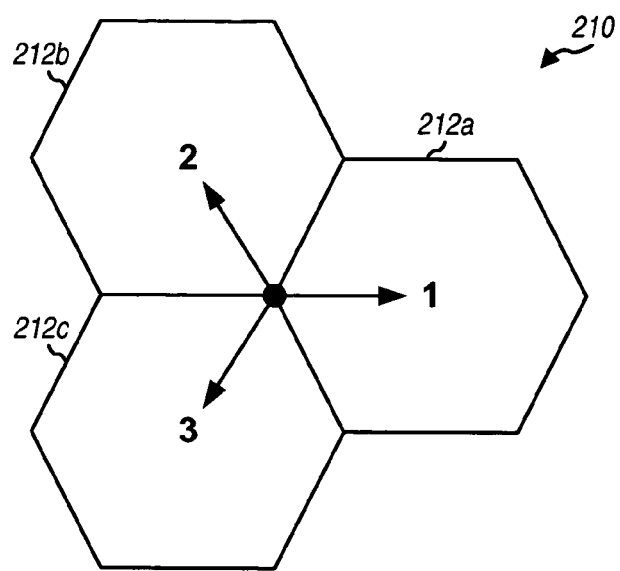
FIG. 2A show a cell with three sectors.

FIG. 2A shows a cell 210 with three sectors 212a, 212b, and 212c. Each base station provides communication coverage for a particular geographic area. The coverage area of each base station may be of any size and shape and is typically dependent on various factors such as terrain, obstructions, and so on. To increase capacity, the base station coverage area may be partitioned into multiple sectors, e.g., three sectors labeled as sectors 1, 2, and 3. Each sector may be defined by a respective antenna beam pattern, and the sectors of a cell typically overlap at the edges. A cell/sector may or may not be a contiguous region, and the cell/sector edge may be quite complex. For simplicity, each sector may be modeled by an ideal hexagon, and the coverage area of each base station may be represented by a clover leaf of three ideal hexagons centered at the base station.

Each sector is typically served by a base transceiver subsystem (BTS). In general, the term "sector" can refer to a BTS and/or its coverage area, depending on the context in which the term is used. For a sectorized cell, the BTSs for all sectors of that cell are typically co-located within the base station for the cell. For simplicity, in the following description, the term "base station" is used generically for both a fixed station that serves a cell and a fixed station that serves a sector. A "serving" base station or "serving" sector is one with which a terminal communicates. The terms "terminal" and "user" are also used interchangeably herein.

The soft handoff techniques described herein may be used for various communication systems. For clarity, these techniques are described for an Orthogonal Frequency Division Multiple Access (OFDMA) system that utilizes orthogonal frequency division multiplexing (OFDM). OFDM effectively partitions the overall system bandwidth into a number of (N) orthogonal frequency subbands, which are also referred to as tones, sub-carriers, bins, frequency channels, and so on. Each subband is associated with a respective sub-carrier that may be modulated with data.

Users with different channel conditions may be distributed throughout the system. The channel condition for each user may be quantified by a carrier-to-interference ratio (C/I), a signal-to-interference-and-noise ratio (SINR), an energy-per-chip-to-total-noise ratio ($E_c/N_o$), received pilot strength, received pilot power, and/or some other signal quality metric. Received pilot strength is the ratio of the received pilot power to the total interference and is often referred to as "geometry". A weak user has a low SINR or weak pilot strength for its serving sector, e.g., due to a low channel gain for its serving sector and/or high inter-sector interference. A weak user may be located anywhere within a sector but is typically located at the sector edge. A weak user typically transmits at a high power level in order to achieve higher SINR at its serving sector and thus causes more interference to other sectors on the reverse link. In contrast, a strong user has a high SINR or strong pilot strength for its serving sector and typically causes less interference to other sectors on the reverse link.

Restrictive reuse can mitigate the deleterious effects of interference caused by weak users on the reverse link. With restrictive reuse, the weak users are allocated subbands that are orthogonal to those used by other users in neighboring sectors and would thus cause no interference to these other users. Restrictive reuse mitigates interference on the reverse link by bandwidth partial loading in each sector and assigning weak users (which are typically strong interferers) to the unused bandwidth in the neighboring sectors. Restrictive reuse may be used for systems composed of unsectorized cells as well as systems composed of sectorized cells. For clarity, restrictive reuse is described below for an exemplary system composed of 3-sector cells.

Figure 2B:
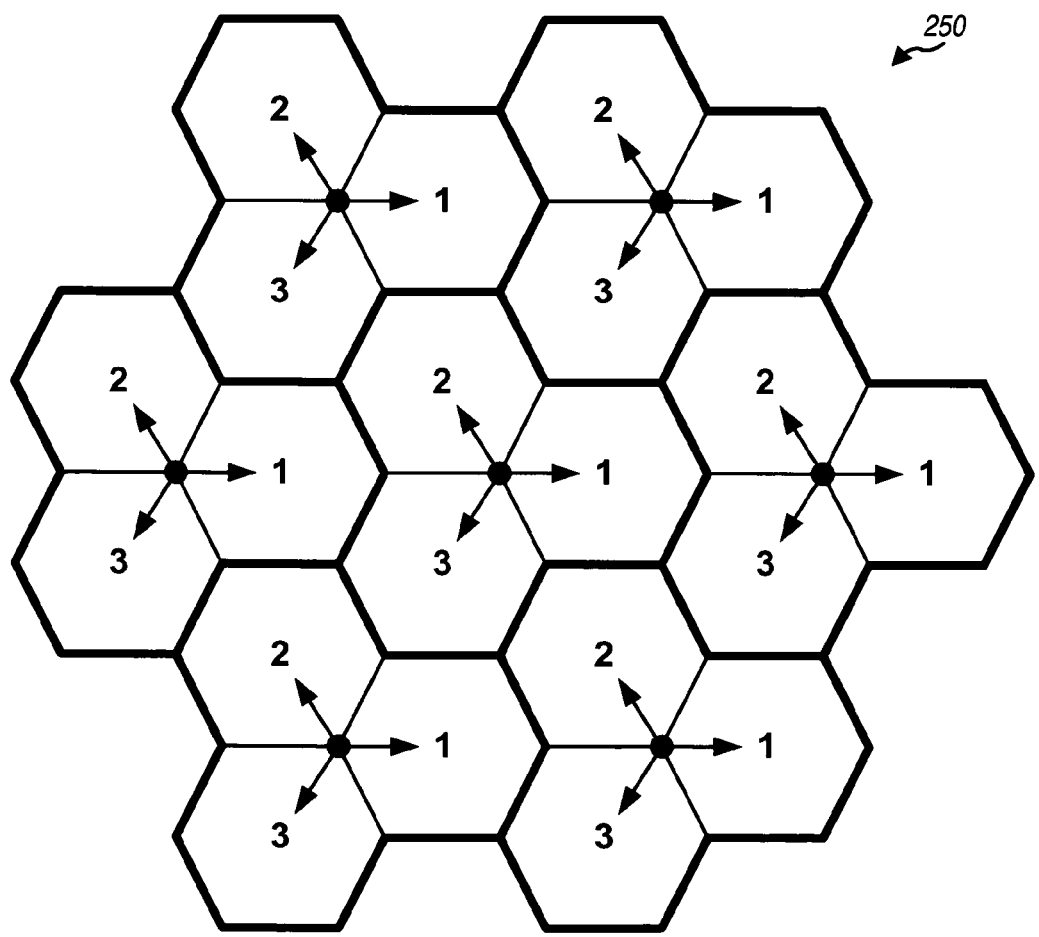
FIG. 2B shows an exemplary multi-cell layout with 3-sector cells.

FIG. 2B shows an exemplary multi-cell layout 250 with each 3-sector cell being modeled by a clover leaf of three hexagons. For this cell layout, each sector is surrounded in the first tier (or the first ring) by sectors that are labeled differently. Thus, each sector 1 is surrounded by six sectors 2 and 3 in the first tier, each sector 2 is surrounded by six sectors 1 and 3, and each sector 3 is surrounded by six sectors 1 and 2.

In an embodiment of restrictive reuse, each sector x is assigned a usable subband set (denoted as $U_x$) and a forbidden or unused subband set (denoted as $F_x$). The usable set contains subbands that may be allocated to users in the sector. The forbidden set contains subbands that are not allocated to the users in the sector. The usable set and the forbidden set for each sector are orthogonal or disjoint in that no subband is included in both sets. The usable set for each sector also overlaps the forbidden set for each neighboring sector. The forbidden sets for multiple neighboring sectors may also overlap. The users in each sector may be allocated subbands from the usable set as described below.

Figure 3A:
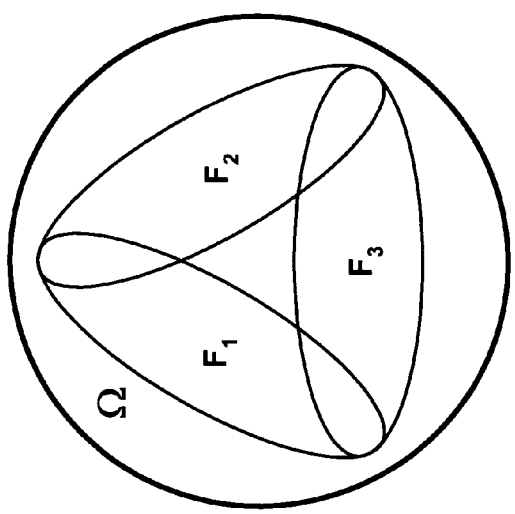
FIG. 3A shows formation of three overlapping forbidden sets for three sectors.

FIG. 3A shows a Venn diagram of three overlapping forbidden sets of subbands, which are labeled as $F_1$, $F_2$ and $F_3$. A full set $\Omega$ contains all N total subbands. Each of the three forbidden sets $F_1$, $F_2$ and $F_3$ is a subset of the full set $\Omega$, or $F_1 \subset \Omega$, $F_2 \subset \Omega$, and $F_3 \subset \Omega$. For the example shown in FIG. 3A, each forbidden set overlaps with each of the other two forbidden sets, and an intersection set operation on any two forbidden sets yields a non-empty set. This property may be expressed as follows:

$$F_{12}=F_1 \cap F_2 \neq \Theta, \ F_{13}=F_1 \cap F_3 \neq \Theta, \text{ and } F_{23}=F_2 \cap F_3 \neq \Theta, \quad \text{Eq (1)}$$

where "∩" denotes an intersection set operation;
$F_{x,y}$ is a set containing subbands that are members of both sets $F_x$ and $F_y$; and
Θ denotes a null/empty set.

For efficient utilization of the available subbands, the three forbidden sets may also be defined such that there is no overlap over all three sets, which may be expressed as:

$$F_{123}=F_1 \cap F_2 \cap F_3 = \Theta. \quad \text{Eq (2)}$$

The condition in equation (2) ensures that each subband is used by at least one sector.

Three usable subband sets $U_1$, $U_2$ and $U_3$ may be formed based on the three forbidden subband sets $F_1$, $F_2$ and $F_3$, respectively. Each usable set $U_x$ may be formed by a difference set operation between the full set Ω and the forbidden set $F_x$, as follows:

$$U_1=\Omega \backslash F_1, \ U_2=\Omega \backslash F_2, \text{ and } U_3=\Omega \backslash F_3, \quad \text{Eq (3)}$$

where "\" denotes a difference set operation; and
$U_x$ is a set containing subbands in the full set Ω that are not in set $F_x$.

The three sectors in each 3-sector cell may be assigned a different pair of usable set and forbidden set. For example, sector 1 may be assigned usable set $U_1$ and forbidden set $F_1$, sector 2 may be assigned usable set $U_2$ and forbidden set $F_2$, and sector 3 may be assigned usable set $U_3$ and forbidden set $F_3$. Each sector has knowledge of the forbidden sets assigned to neighboring sectors. Thus, sector 1 is aware of forbidden sets $F_2$ and $F_3$ assigned to neighboring sectors 2 and 3, sector 2 is aware of forbidden sets $F_1$ and $F_3$ assigned to neighboring sectors 1 and 3, and sector 3 is aware of forbidden sets $F_1$ and $F_2$ assigned to neighboring sectors 1 and 2.

Figure 3B:
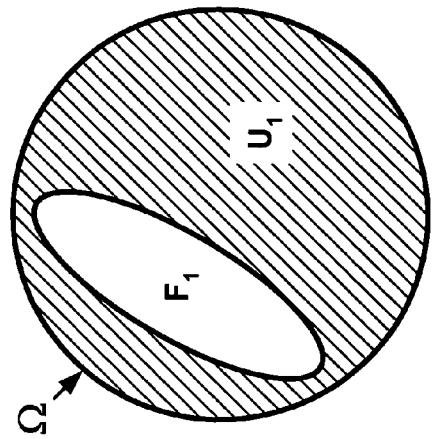
FIGS. 3B through 3E show usable and restricted subband sets for a sector.

FIG. 3B shows a Venn diagram of the usable set $U_1$ assigned to sector 1. Usable set $U_1$ (shown by diagonal hashing) includes all of the N total subbands except for the subbands in the forbidden set $F_1$.

Figure 3D:
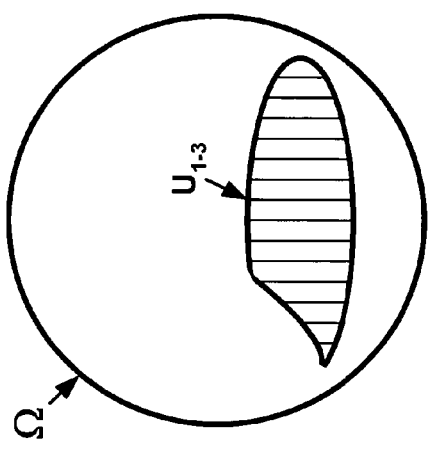
Figure 3C:
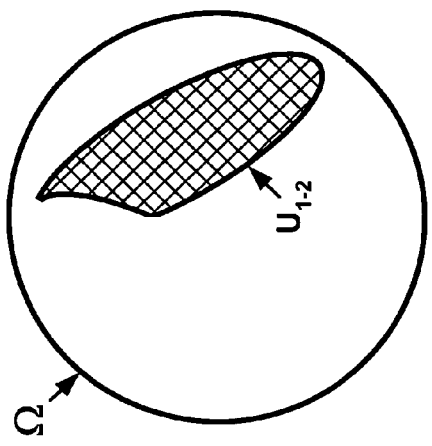

FIG. 3C shows a Venn diagram of a restricted set $U_{1-2}$ (shown by cross-hashing) for sector 1. Restricted set $U_{1-2}$ contains subbands included in both the usable set $U_1$ for sector 1 and the forbidden set $F_2$ for sector 2. Since the subbands in forbidden set $F_2$ are not used by sector 2, the subbands in restricted set $U_{1-2}$ do not cause interference to sector 2 on the reverse link.

FIG. 3D shows a Venn diagram of a restricted set $U_{1-3}$ (shown by vertical hashing) for sector 1. Restricted set $U_{1-3}$ contains subbands included in both the usable set $U_1$ for sector 1 and the forbidden set $F_3$ for sector 3. Since the subbands in forbidden set $F_3$ are not used by sector 3, the subbands in restricted set $U_{1-3}$ do not cause interference to sector 3 on the reverse link.

Figure 3E:
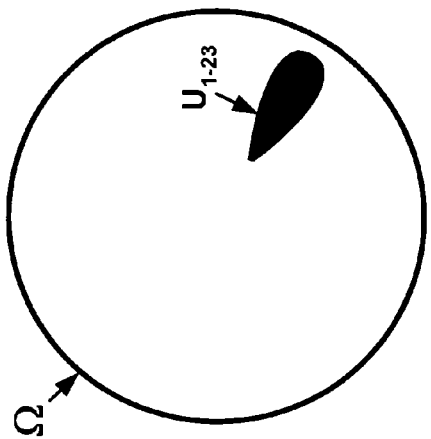

FIG. 3E shows a Venn diagram of a restricted set $U_{1-23}$ (shown by solid fill) for sector 1. Restricted set $U_{1-23}$ contains subbands included in the usable set $U_1$ for sector 1, the forbidden set $F_2$ for sector 2, and the forbidden set $F_3$ for sector 3. Since the subbands in forbidden sets $F_2$ and $F_3$ are not used by sectors 2 and 3, respectively, the subbands in restricted set $U_{1-23}$ do not cause interference to sector 2 or 3 on the reverse link.

As shown in FIGS. 3B through 3E, the restricted sets $U_{1-2}$, $U_{1-3}$ and $U_{1-23}$ are different subsets of the usable set $U_1$ for sector 1. Restricted sets $U_{2-1}$, $U_{2-3}$ and $U_{2-13}$ may be formed for sector 2, and restricted sets $U_{3-1}$, $U_{3-2}$ and $U_{3-12}$ may be formed for sector 3 in similar manner. Table 1 lists the usable and restricted sets for the three sectors and the manner in which these sets may be formed. The "reuse" sets in the first column of Table 1 are described below.

TABLE 1

| Reuse Set | Usable Subband Sets | Description |
|---|---|---|
| (1) | $U_1 = \Omega \backslash F_1$ | Usable set for sector 1 |
| (1, 2) | $U_{1-2} = U_1 \cap F_2 = F_2 \backslash (F_1 \cap F_2)$ | Restricted set with no interference to sector 2 |
| (1, 3) | $U_{1-3} = U_1 \cap F_3 = F_3 \backslash (F_1 \cap F_3)$ | Restricted set with no interference to sector 3 |
| (1, 2, 3) | $U_{1-23} = U_1 \cap F_2 \cap F_3 = F_2 \cap F_3$ | Restricted set with no interference to sectors 2 & 3 |
| (2) | $U_2 = \Omega \backslash F_2$ | Usable set for sector 2 |
| (2, 1) | $U_{2-1} = U_2 \cap F_1 = F_1 \backslash (F_1 \cap F_2)$ | Restricted set with no interference to sector 1 |
| (2, 3) | $U_{2-3} = U_2 \cap F_3 = F_3 \backslash (F_2 \cap F_3)$ | Restricted set with no interference to sector 3 |
| (2, 1, 3) | $U_{2-13} = U_2 \cap F_1 \cap F_3 = F_1 \cap F_3$ | Restricted set with no interference to sectors 1 & 3 |
| (3) | $U_3 = \Omega \backslash F_3$ | Usable set for sector 3 |
| (3, 1) | $U_{3-1} = U_3 \cap F_1 = F_1 \backslash (F_1 \cap F_3)$ | Restricted set with no interference to sector 1 |
| (3, 2) | $U_{3-2} = U_3 \cap F_2 = F_2 \backslash (F_2 \cap F_3)$ | Restricted set with no interference to sector 2 |
| (3, 1, 2) | $U_{3-2} = U_3 \cap F_1 \cap F_2 = F_1 \cap F_2$ | Restricted set with no interference to sectors 1 & 2 |

Each sector x (where x=1, 2, or 3) may allocate the subbands in its usable set $U_x$ to users in the sector by taking into account the users' channel conditions so that reasonably good performance may be achieved for all users. Sector x may have weak users as well as strong users. Sector x may allocate any of the subbands in its usable set $U_x$ to the strong users and may allocate subbands in the restricted sets to the weak users. The weak users are thus restricted to certain subbands that are not used by neighboring sectors. For example, a given user u in sector x may be allocated subbands from usable set $U_x$. If user u is deemed to cause high interference to sector y, where y≠x, then user u may be allocated subbands from the restricted set $U_{x-y}=U_x \cap F_y$. If user u is further deemed to cause high interference to sector z, where z≠x and z≠y, then user u may be allocated subbands from the restricted set $U_{x-yz}=U_x \cap F_y \cap F_z$.

Figure 4:
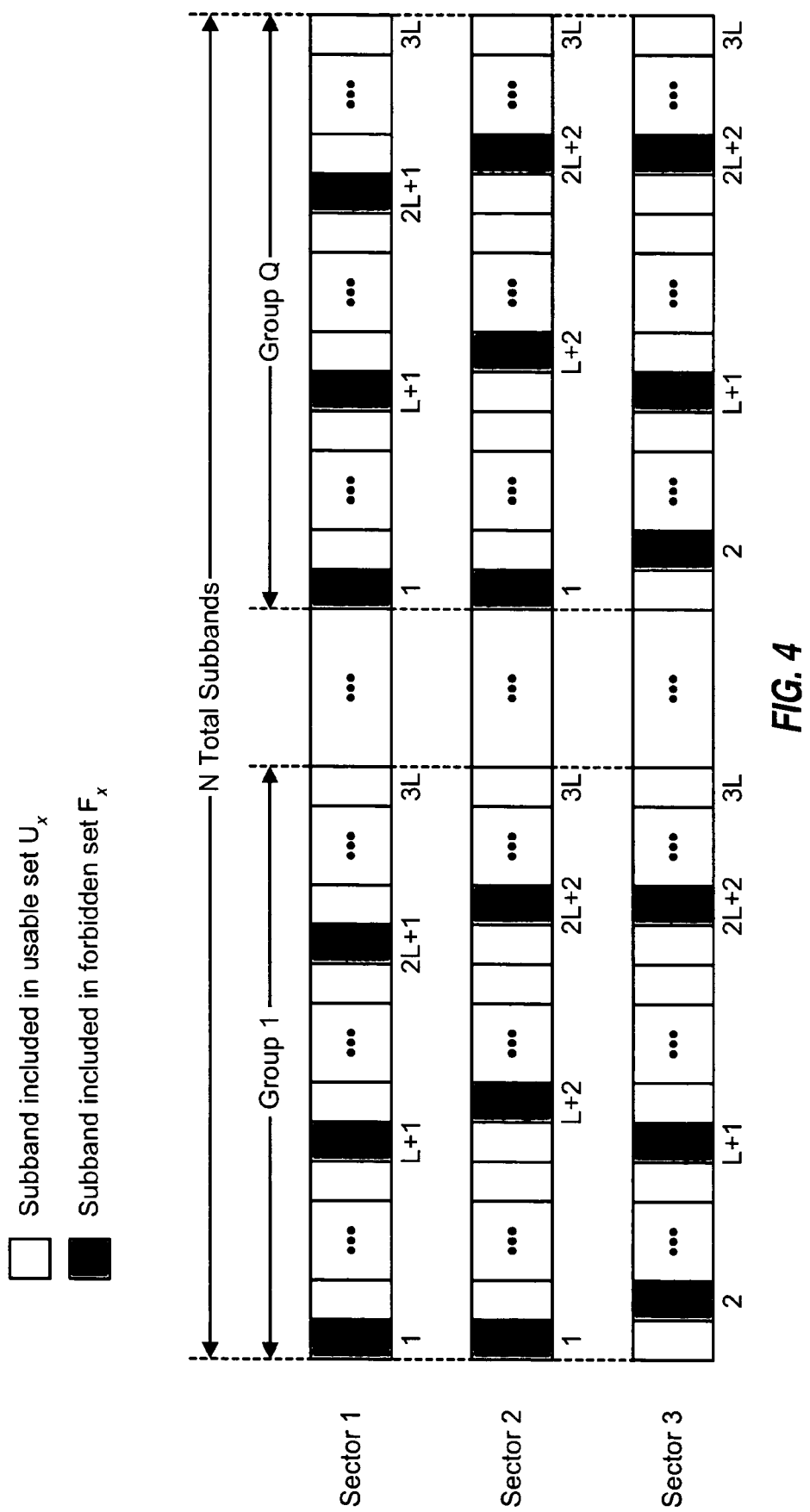
FIG. 4 shows an example for forming three forbidden subband sets.

FIG. 4 shows an example for forming the three forbidden subband sets $F_1$, $F_2$ and $F_3$. In this example, the N total subbands are partitioned into Q groups, with each group containing 3·L subbands that are given indices of 1 through 3L, where Q≧1 and L>1. Forbidden set $F_1$ contains subbands 1, L+1, and 2L+1 in each group. Forbidden set $F_2$ contains subbands 1, L+2, and 2L+2 in each group. Forbidden set $F_3$ contains subbands 2, L+1, and 2L+2 in each group. Set $F_{12}$ then contains subband 1 in each group, set $F_{13}$ contains subband L+1 in each group, and set $F_{23}$ contains subband 2L+2 in each group.

In general, each forbidden set may contain any number of subbands and any one of the N total subbands, subject to the constraints shown in equations (1) and (2). To obtain frequency diversity, each forbidden set may contain subbands taken from across the N total subbands. The subbands in each forbidden set may be selected based on a predetermined pattern (as shown in FIG. 4) or in a pseudo-random manner. The three forbidden sets $F_1$, $F_2$ and $F_3$ may also be defined with any amount of overlap. The amount of overlap may be dependent on various factors such as, e.g., the desired effective reuse factor for each sector, the expected number of weak users in each sector, and so on. The three forbidden sets may overlap each other by the same amount, as shown in FIGS. 3A and 4, or by different amounts.

The usable and forbidden sets may be defined in various manners. In one embodiment, the usable and forbidden sets are defined based on global frequency planning for the system and remain static. Each sector is assigned a usable set and a forbidden set, forms its restricted sets as described above, and thereafter uses the usable and restricted sets. In another embodiment, the usable and forbidden sets may be dynamically defined based on sector loading and possibly other factors. For example, the forbidden set for each sector may be dependent on the number of weak users in neighboring sectors, which may change over time. A designated sector or a system entity may receive loading information for various sectors, define the usable and forbidden sets, and assign the sets to the sectors. In yet another embodiment, the sectors may send inter-sector messages to negotiate the usable and forbidden sets.

Each user may be associated with a "reuse" set that contains the serving sector for the user as well as non-serving sectors that may observe high interference from the user. The serving sector is denoted by boldfaced and underlined text in the reuse set. The non-serving sectors are denoted by normal text in the reuse set. For example, a reuse set of (2, 1, 3) denotes sector 2 being the serving sector and sectors 1 and 3 being the non-serving sectors. The non-serving sectors may be determined in various manners.

In one embodiment, the non-serving sectors for a given user u are determined based on pilot measurements made by user u for different sectors. Each sector typically transmits a pilot on the forward link, which is used by the terminals for acquisition and channel estimation. User u may search for pilots transmitted by sectors in the system and measure each detected pilot. User u may compare the pilot measurement for each detected sector against a power threshold and add the sector to the reuse set if the pilot measurement exceeds the power threshold.

In another embodiment, the non-serving sectors for user u are determined based on an "active" set maintained for user u. The active set contains all sectors that are candidates for serving user u. A sector may be added to the active set, e.g., if the pilot measurement for the sector exceeds an add threshold, which may or may not be equal to the power threshold described above.

In yet another embodiment, the non-serving sectors for user u are determined based on pilot measurements made by different sectors for user u. Each user may transmit a pilot on the reverse link. Each sector may search for pilots transmitted by users in the system and measure each detected pilot. Each sector may compare the pilot measurement for each detected user against the power threshold and inform the user's serving sector if the pilot measurement exceeds the power threshold. The serving sector for each user may then add sectors that have reported high pilot measurement to the user's reuse set.

In yet another embodiment, the non-serving sectors for user u are determined based on a position estimate for user u. The position of user u may be estimated using various position determination techniques such as, e.g., Global Positioning System (GPS) and Advanced Forward Link Trilateration (A-FLT), which are known in the art. The non-serving sectors for user u may be determined based on the position estimate for user u and sector/cell layout information.

Several embodiments for determining the non-serving sectors for each user have been described above. The non-serving sectors may also be determined in other manners and/or based on other measurements. In general, the non-serving sectors may be determined based on forward link and/or reverse link measurements. The forward and reverse links may be assumed to be reciprocal over the long term. In this case, a strong pilot measurement made by a given user for a given sector on the forward link usually implies that the sector will receive strong interference from the user on the reverse link. Hence, membership in the reuse set may be determined based on forward link measurements, which are also used to deduce the amount of interference observed by the member sectors on the reverse link.

Each user may receive pilots from one or multiple sectors at any given moment and may select the strongest received sector as the serving sector. A user may also select a sector that is not strongest received as the serving sector. This may be the case, e.g., if the strongest received sector and another strongly received sector have the same usable set, or if the pilot measurement for the strongest received sector has not exceeded a delta threshold to switch serving sector. In a well-designed system, a weak user should have a moderate pilot measurement for at least one neighboring sector to allow the weak user to be handed off from the serving sector to a neighboring sector if necessary. Thus, the reuse set for each user often includes the serving sector as well as at least one non-serving sector.

The reuse set and/or active set for each user may be maintained by the user or the serving sector. A given user u may maintain and update its reuse and/or active set based on pilot measurements for different sectors. User u may (e.g., periodically or when requested) report its reuse and/or active set to its serving sector. The serving sector for user u may also maintain and update the reuse and/or active set for user u based on forward link pilot measurements made by user u, reverse link pilot measurements made by different sectors for user u, and so on. For example, user u may report pilot measurements or request to add/drop set member, and the serving sector may make the decision to update the reuse and/or active set and send the updated set(s) to user u. In any case, the reuse and/or active set information is available at the serving sector and may be used for restrictive reuse and soft handoff.

Figure 5:
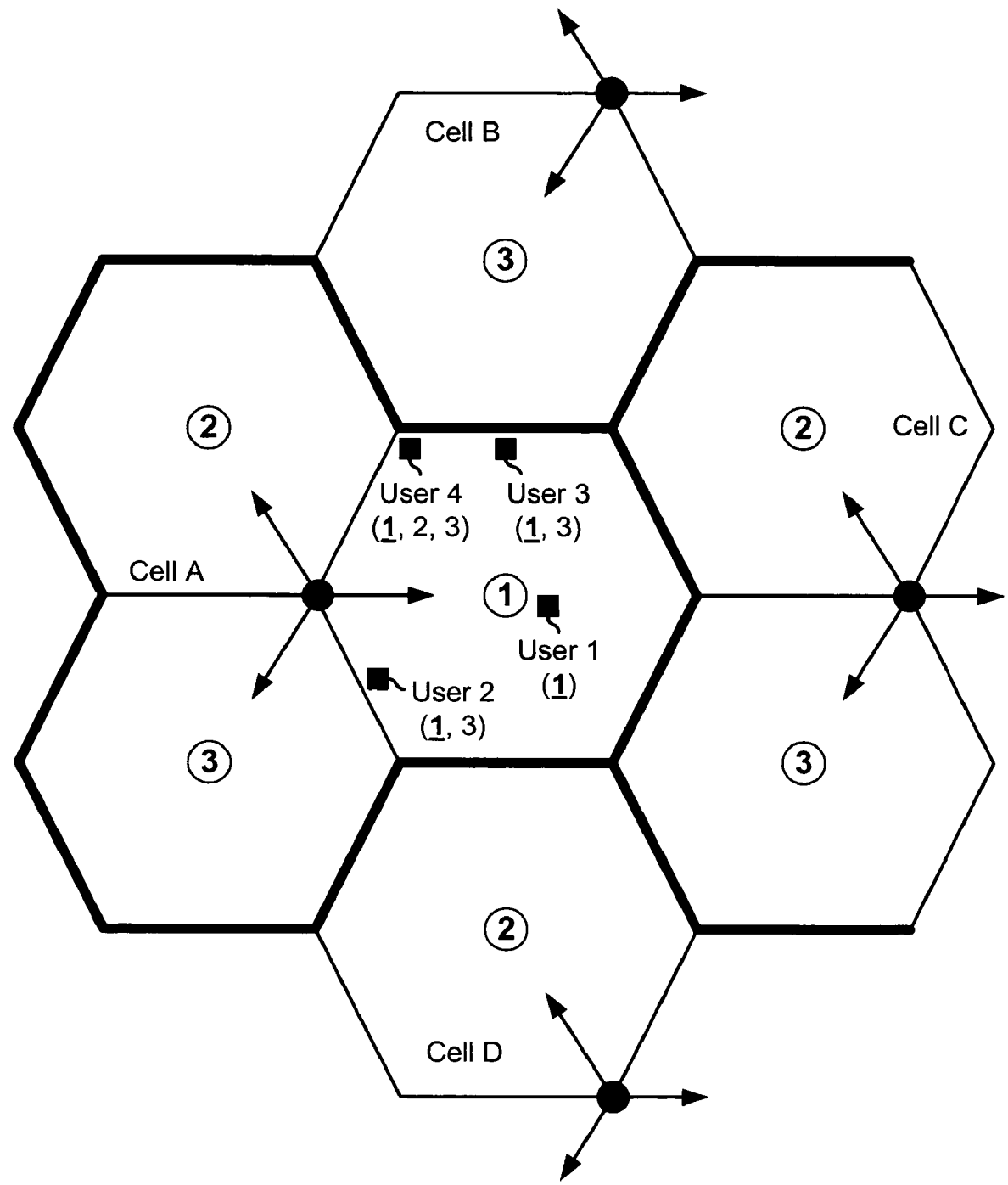
FIG. 5 shows a distribution of four users in a cluster of seven sectors.

FIG. 5 shows an example distribution of four users in a cluster of seven sectors. In this example, user 1 is located near the middle of sector 1 and has a reuse set of (1). User 2 is located near the boundary between sectors 1 and 3 of the same cell A and has a reuse set of (1, 3). User 3 is located near the boundary between sectors 1 and 3 of different cells A and B and also has a reuse set of (1, 3). User 4 is located near the boundary of sectors 1, 2 and 3 and has a reuse set of (1, 2, 3).

User 1 is allocated subbands in usable set $U_1$ because its reuse set is (1). Since usable set $U_1$ is not orthogonal to usable sets $U_2$ and $U_3$ for sectors 2 and 3, respectively, user 1 causes interference to the six neighboring sectors 2 and 3 in the first tier around sector 1. However, the amount of interference caused by user 1 may be small because of the relatively large distances to these neighboring sectors. Users 2 and 3 are allocated subbands in restricted set $U_{1-3} = U_1 \cap F_3$ because their reuse sets are both (1, 3). Since sector 3 does not use the subbands in its forbidden set $F_3$, users 2 and 3 do not cause any interference to sector 3. User 4 is allocated subbands in restricted set $U_{1-23} = U_1 \cap F_2 \cap F_3$ because its reuse set is (1, 2, 3). Since sectors 2 and 3 do not use the subbands in their forbidden sets $F_2$ and $F_3$, respectively, user 4 does not cause any interference to sectors 2 and 3.

Restrictive reuse can thus mitigate interference caused by weaker users (which are typically strong interferers) and thus generally improves the SINRs for users in the system. Restrictive reuse may also reduce variation in SINRs among the users in the system. As a result, improved communication coverage as well as higher overall system capacity may be achieved for the system.

Soft handoff may be used in conjunction with restrictive reuse to improve performance for weak users on the reverse link. Soft handoff on the reverse link may be achieved via coordination among the serving and non-serving sectors. Soft handoff with restrictive reuse may be implemented in various manners, and a specific embodiment is described below.

Figure 6:
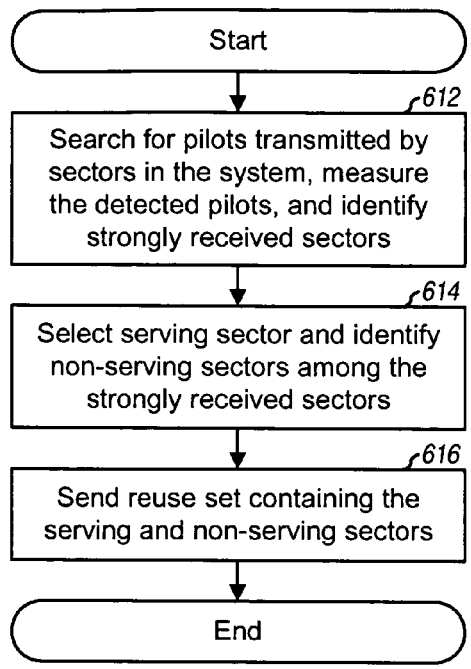
FIG. 6 shows a process for ascertaining serving and non-serving sectors.

FIG. 6 shows a flow diagram of a process 600 performed by a terminal to form its reuse set. The terminal searches for pilots transmitted on the forward link by sectors in the system, measures the detected pilots, and identifies strongly received sectors (block 612). The terminal selects the serving sector and identifies non-serving sectors among the strongly received sectors (block 614). The terminal then forms its reuse set, which contains the serving and non-serving sectors for the terminal, and sends the reuse set to the serving sector (block 616).

Figure 7:
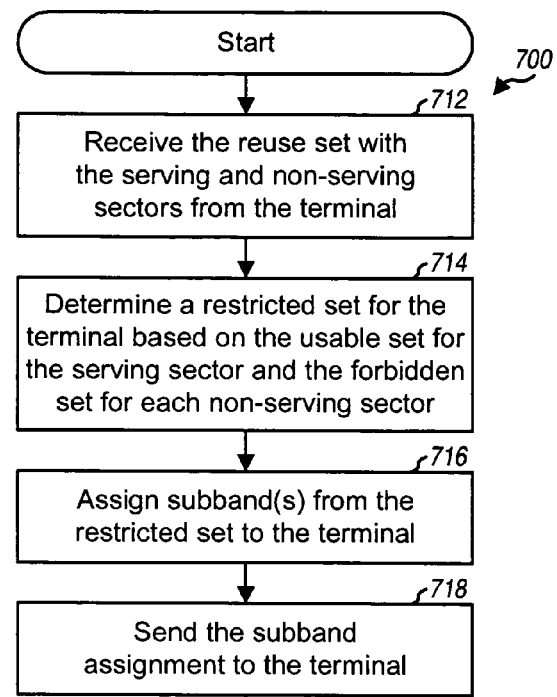
FIG. 7 shows a process for assigning subbands to the terminal.

FIG. 7 shows a flow diagram of a process 700 performed by the serving sector to assign subbands to the terminal for data transmission on the reverse link. The serving sector receives the reuse set from the terminal (block 712) and determines a restricted set for the terminal based on the usable set for the serving sector and the forbidden set for each non-serving sector (block 714). The serving sector assigns one or more subbands from the restricted set to the terminal (block 716) and sends the subband assignment to the terminal (block 718). If soft handoff is to be supported for the terminal, as determined in block 720, then the serving sector sends the subband assignment for the terminal to each non-serving sector (block 722). All sectors in the terminal's reuse set have knowledge of the subband assignment for the terminal.

Figure 8:
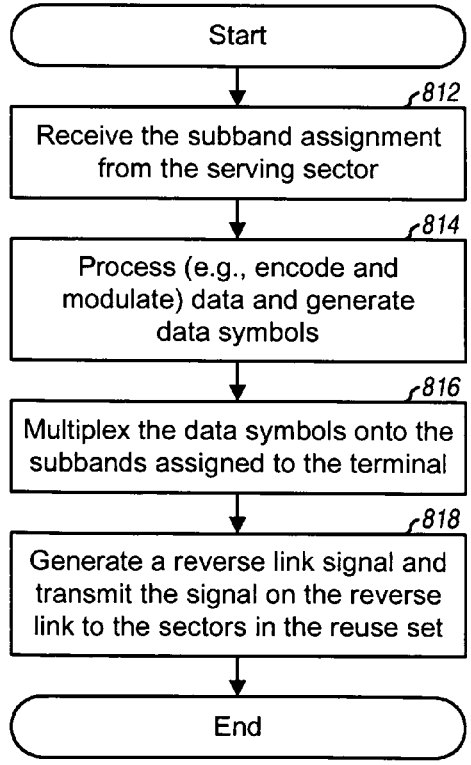
FIG. 8 shows a process for transmitting on the reverse link with soft handoff and restrictive reuse.

FIG. 8 shows a flow diagram of a process 800 performed by the terminal for data transmission on the reverse link with soft handoff and restrictive reuse. The terminal receives the subband assignment from the serving sector (block 812). The terminal processes (e.g., encodes and modulates) traffic/packet data and generates data symbols (block 814). The terminal multiplexes the data symbols onto the subbands assigned to the terminal and multiplexes pilot symbols on subbands used for pilot transmission (block 816). The terminal then generates a reverse link signal and transmits this signal on the reverse link to the sectors in the reuse set (block 818).

Figure 9:
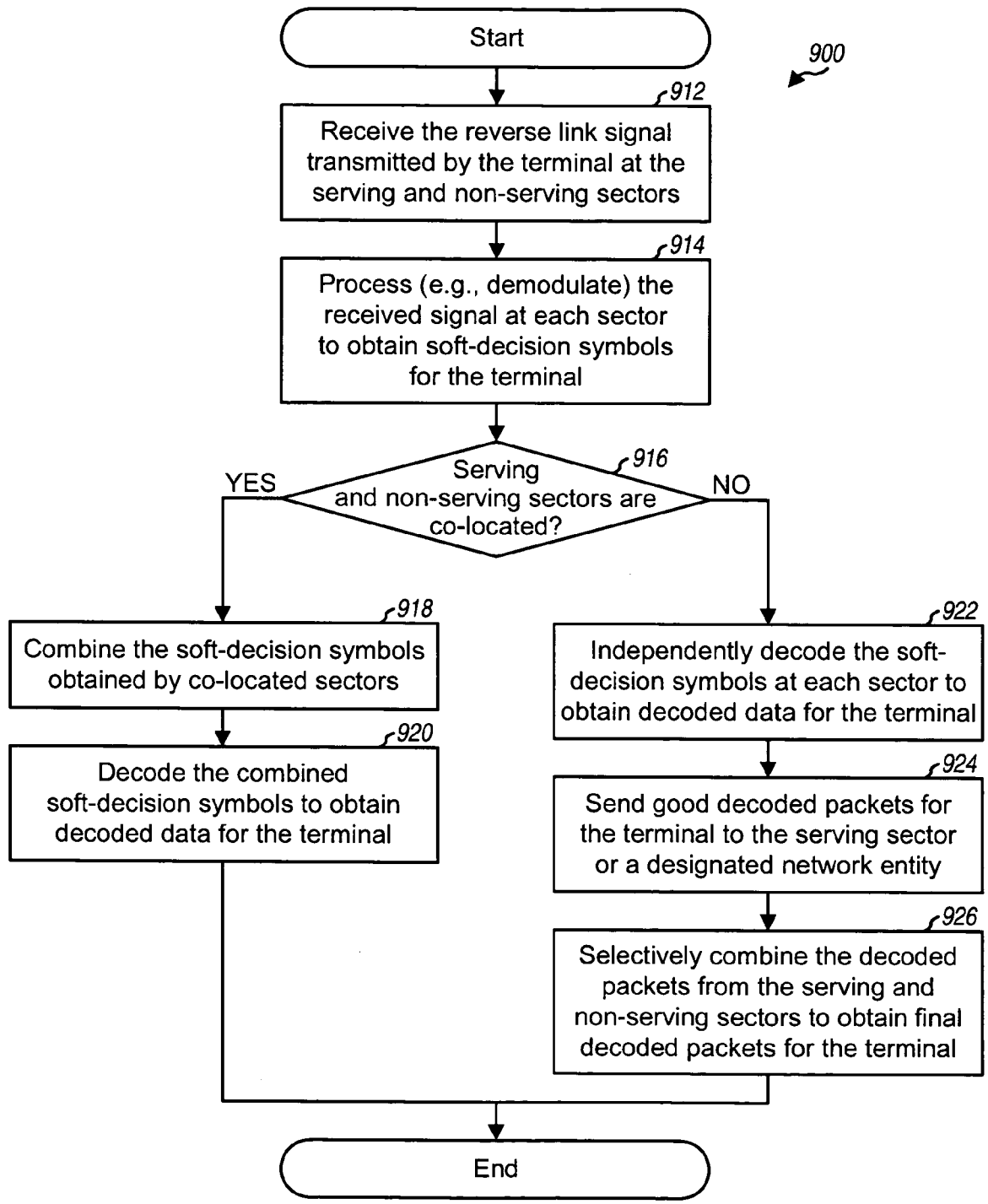
FIG. 9 shows a process for receiving the reverse link transmission.

FIG. 9 shows a flow diagram of a process 900 performed by the serving and non-serving sectors to receive the reverse link transmission from the terminal with soft handoff. The reverse link signal transmitted by the terminal is received at each of the serving and non-serving sectors for the terminal (block 912). Each sector processes (e.g., data demodulates) its received signal to obtain soft-decision symbols for the terminal (block 914). A soft-decision symbol is a multi-bit value obtained by a receiver for a single-bit (or "hard") value sent by a transmitter, with the additional bits being used to capture uncertainty in the single-bit value due to noise and other artifacts. Since the terminal is assigned subbands in the forbidden sets for the non-serving sectors, the terminal's reverse link signal observes no interference from the users in the non-serving sectors and may be demodulated by these sectors.

A determination is then made whether the serving sector and non-serving sectors are co-located (block 916). The BTSs for all sectors of the same cell are typically co-located within the base station for that cell. Multiple sectors are thus co-located if they belong to the same cell and are not co-located if they belong to different cells. For example, sectors 1 and 3 for user 2 in FIG. 5 are co-located because these sectors belong to the same cell A, whereas sectors 1 and 3 for user 3 are not co-located because these sectors belong to different cells A and B.

For all serving and non-serving sectors that are co-located, the soft-decision symbols obtained by these sectors for the terminal are available at the base station and may be combined to improve the quality of the soft-decision symbols for the terminal (block 918). The combined soft-decision symbols are then decoded to obtain decoded data for the terminal (block 920).

For serving and non-serving sectors that are not co-located, the soft-decision symbols obtained by each sector may be independently decoded by each sector to obtain decoded data for the terminal (block 922). The soft-decision symbols typically require many more bits to represent than the decoded data and are typically not sent among sectors that are not co-located because a large amount of signaling would be needed to send these symbols. Each non-serving sector may then send good (successfully) decoded packets for the terminal to the serving sector or a designated network entity (block 924). The serving sector or designated network entity then selectively combines decoded packets from all sectors to obtain final decoded packets for the terminal (block 926).

A user may have non-serving sectors that are co-located with the serving sector as well as non-serving sectors that are not co-located. For example, user 4 in FIG. 5 has a co-located non-serving sector 2 and a non-serving sector 3 that is not co-located. In this case, the soft-decision symbols obtained by co-located sectors 1 and 2 may be combined and then decoded to obtain decoded packets for the user (blocks 918 and 920). The soft-decision symbols obtained by non-serving sector 3 may be independently decoded to obtain decoded packets for the user (blocks 922 and 924). The decoded packets from the various sectors may be selectively combined to obtain final decoded packets for the user (block 926).

Soft-decision symbol combining (or simply, soft combining) may be selectively performed for a user based on various criteria such as, e.g., interference measurements at the co-located non-serving sectors, the quality of the channel estimates obtained by these sectors for the user, and so on. The amount of interference on the subbands in the usable and forbidden sets for each sector may vary widely depending on the distribution of weak and strong users in the system. If the interference level on the subbands in the forbidden set for a given non-serving sector v is high, then performance may actually degrade by combining the soft-decision symbols obtained for the subbands in this forbidden set with the soft-decision symbols obtained for the subbands in the usable set for the serving sector. Each non-serving sector for the user may estimate the interference observed on the subbands in that sector's forbidden set, the subbands in the restricted set for the user, the subbands assigned to the user, and so on. The soft combining may be selectively performed for the user based on the interference measurements. For example, soft combining may be performed if the interference measured by non-serving sector v is below an interference threshold and skipped otherwise. Furthermore, since the soft-decision symbols from different sectors are typically combined based on channel estimates obtained by these sectors for the user, performance may degrade if the soft combining is performed using channel estimates that are of poor quality. A channel estimate may be deemed to be poor, e.g., if the interference level is high. Soft combining may be performed if reasonably good channel estimates are available for the terminal.

A given sector v may receive subband assignments for one or more weak users located in other sectors and having sector v as their non-serving sector. Sector v may support soft handoff for any number and any one of these weak users. Sector v may skip the soft combining for all of the weak users if high interference is measured for the subbands in the forbidden set for sector v. Sector v may also skip soft handoff for any of the weak users. For example, sector v may choose to support soft handoff for only the user with the strongest pilot measurement at sector v among all of these weak users.

Each user typically transmits a pilot on the reverse link to allow the sectors to derive channel estimates for the user. The channel estimates may be used for data detection, soft combining, and so on. Since performance is typically impacted by the quality of the channel estimates, the users may transmit their pilots in a manner to enhance the quality of the channel estimates. For example, each sector may be assigned an orthogonal sequence (e.g., a Walsh sequence), and users may transmit their pilots using the orthogonal sequence assigned to their serving sectors. Neighboring sectors may be assigned different orthogonal sequences so that the pilots transmitted by the users in different sectors are orthogonal to one another. Orthogonal pilots for neighboring sectors may improve channel estimation performance.

Soft handoff has been described above for an embodiment of restrictive reuse whereby each sector is associated with one usable set and one forbidden set. Soft handoff may also be performed in conjunction with other embodiments of restrictive reuse. In general, each sector may be assigned any number of usable subband sets and any number of "constrained" subband sets. A constrained subband set may be a forbidden subband set or a limited use subband set. A limited use set contains subbands having certain use restrictions such as, e.g., a lower transmit power limit. As an example, a sector may be assigned multiple constrained subband sets. One constrained subband set may be a forbidden subband set, and the remaining constrained subband set(s) may have different transmit power limits and may be allocated to different tiers of strong users in the sector. As another example, a sector may be assigned multiple constrained subband sets (and no forbidden set), and each constrained subband set may have a different transmit power limit. In general, a weak user may be allocated subbands taken from the usable set for the serving sector and the forbidden and/or constrained sets for the non-serving sectors. The use of multiple usable and/or constrained sets for each sector may allow for better matching of subbands to weak users in different sectors.

Soft handoff with restrictive reuse may be used for various data transmission schemes. For an unacknowledged data transmission scheme, a terminal processes and transmits each packet once. Retransmission of packets received in error by the serving and non-serving sectors may be initiated by a protocol at a higher layer or rescheduled by a network entity.

For a hybrid automatic retransmission (H-ARQ) scheme, a terminal processes each packet to generate multiple blocks, with each block containing different redundancy information. The terminal then transmits one block at a time until the packet is decoded correctly or all blocks have been transmitted. The serving and non-serving sectors attempt to decode the packet after each block transmission by the terminal. The serving sector may send back an acknowledgment (ACK) if the packet is decoded correctly or a negative acknowledgment (NAK) if the packet is decoded in error. The terminal may terminate the transmission for the packet upon receiving an ACK from the serving sector. Alternatively, the serving and non-serving sectors may each send an ACK or NAK for each block received from the terminal, and the terminal may terminate the transmission of the packet upon receiving an ACK from any sector.

Soft handoff with restrictive reuse may affect some protocols above the physical layer. The protocol stack for the system may include, e.g., a higher layer that resides above a Medium Access Control (MAC) layer, which in turn resides above a physical (PHY) layer. The higher layer may implement the well-known Internet Protocol (IP) for packet data transmission. A Radio Link Protocol (RLP) typically resides within the MAC layer and supports retransmission of data to achieve a lower frame error rate (FER) than what the physical layer can achieve alone. IP packets are encapsulated in RLP frames, which are further encapsulated in MAC protocol data units (PDUs). Each MAC PDU may carry a partial or complete RLP frame or multiple RLP frames.

For a reverse link data transmission, a transmitter RLP entity at the terminal manages the transmission of RLP frames and the retransmission of RLP frames received in error. A receiver RLP entity may be maintained at each of the serving and non-serving sectors to manage the reception of RLP frames from the terminal and the reassembly of RLP frames received out of sequence due to retransmission. The receiver RLP entities at the serving and non-serving sectors may communicate with each other to synchronize the RLP states at these sectors. The RLP synchronization ensures that the terminal does not retransmit an RLP frame that has already been decoded correctly by one of the sectors. The RLP communication should be sufficiently fast so that the operation of HARQ, if employed, is not affected by the RLP. Alternatively, a single receiver RLP entity may be maintained at an "anchor" base station or some other network entity designated to handle the RLP for the terminal.

Soft handoff with restrictive reuse may be used with various traffic channel structures. For example, multiple orthogonal traffic channels may be defined for each sector whereby (1) each traffic channel may be assigned zero, one, or multiple usable subbands in each time interval and (2) no two traffic channels use the same subband in any given time interval. The traffic channels for users not in soft handoff may be assigned subbands in the usable set. The traffic channels for users in soft handoff with one or more neighboring sectors may be assigned subbands in the restricted sets formed for these users. A traffic channel may be viewed as a convenient way of expressing an assignment of subbands for different time intervals.

An OFDMA system may or may not use frequency hopping (FH). With frequency hopping, a data transmission hops from subband to subband in a pseudo-random manner, which can provide frequency diversity and other benefits. For a frequency hopping OFDMA (FH-OFDMA) system, each traffic channel may be associated with a specific FH sequence that indicates the particular subband(s) to use for that traffic channel in each time interval (or hop period). The FH sequences for different traffic channels in each sector are orthogonal to one another so that no two traffic channels use the same subband in any given hop period. The FH sequences for each sector may also be pseudo-random with respect to the FH sequences for neighboring sectors. These properties for the FH sequences minimize intra-sector interference and randomize inter-sector interference.

A serving sector may assign an FH sequence to a user for data transmission on the reverse link. For soft handoff, the serving sector also sends this FH sequence to the non-serving sectors. The non-serving sectors are then able to perform the complementary de-hopping to recover the reverse link transmission sent by the user.

For clarity, soft handoff with restrictive reuse has been specifically described for a system with 3-sector cells. In general, soft handoff with restrictive reuse may be used with any reuse pattern. For a K-sector/cell reuse pattern, the forbidden set for each sector/cell may be defined such that it overlaps with the forbidden set for each of the other K-1 sectors/cells, and may overlap with different combinations of other forbidden sets. Each sector/cell may form different restricted sets for different neighboring sectors based on its usable set and the forbidden sets for the neighboring sectors. Each sector/cell may then use the usable and restricted sets as described above.

Soft handoff with restrictive reuse has also been described for an OFDMA system. Soft handoff with restrictive reuse may also be used for a TDMA system, a Frequency Division Multiple Access (FDMA) system, a CDMA system, a multi-carrier CDMA system, Global System for Mobile Communications (GSM) system, and so on. In general, the system resources to be reused (e.g., frequency subbands, RF channels, time slots, and so on) may be partitioned into usable and forbidden sets. The usable and forbidden sets for each sector/cell are orthogonal to one another. The forbidden sets for neighboring sectors/cells overlap one another. Each sector may form restricted sets based on its usable set and the forbidden sets for neighboring sectors/cells.

Figure 10:
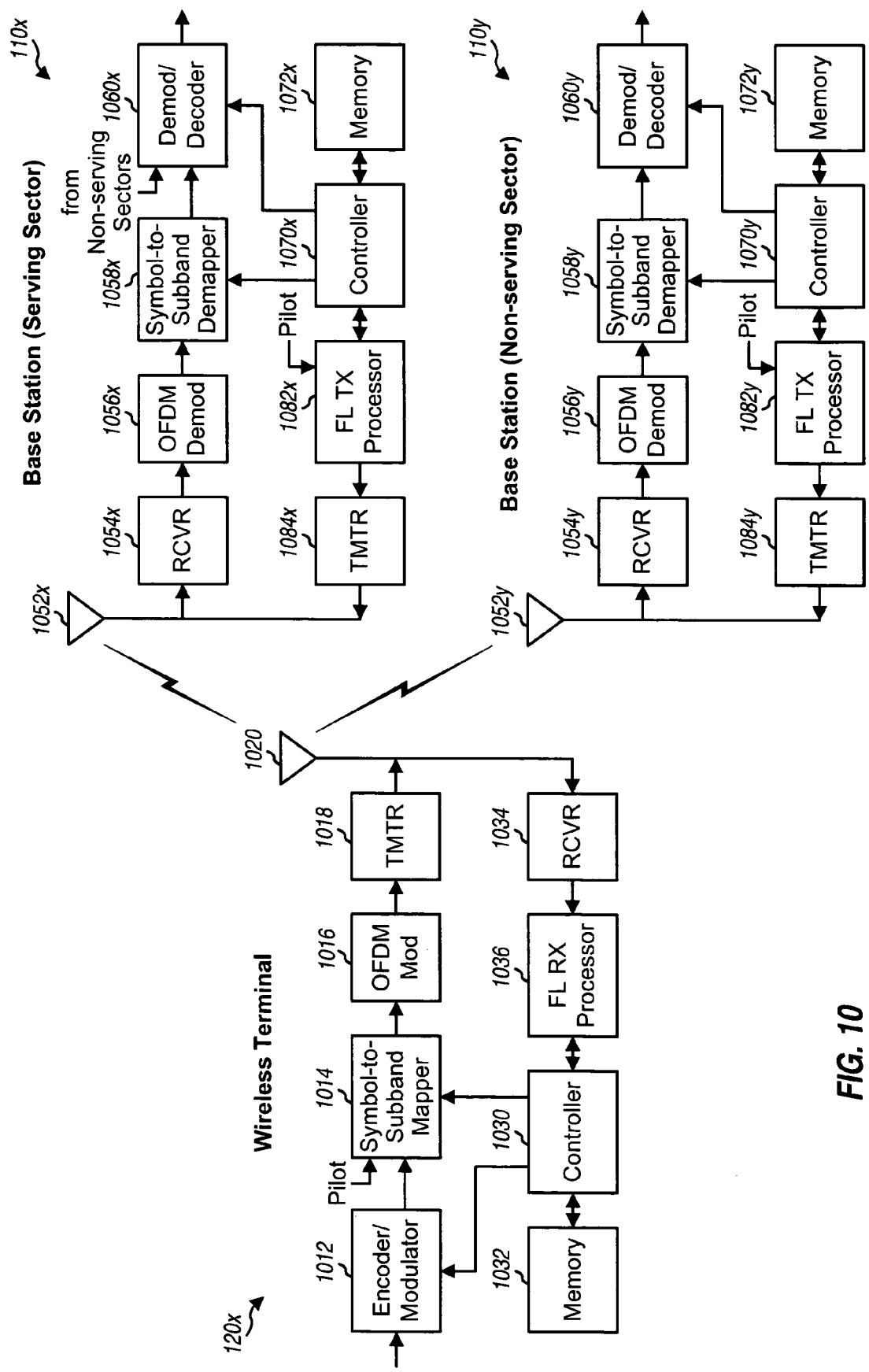
FIG. 10 shows a terminal and two base stations for the serving and non-serving sectors.

FIG. 10 shows a block diagram of an embodiment of a terminal 110x and base stations 110x and 110y for the serving and non-serving sectors, respectively. For simplicity, the following description for FIG. 10 is for one non-serving sector and for an OFDMA system. In general, the processing for data transmission and reception is dependent on the system design.

At each base station 110, a forward link transmit (FL TX) processor 1082 processes (e.g., encodes, interleaves, symbol maps, and OFDM modulates) data and pilot for transmission on the forward link. A transmitter unit (TMTR) 1084 processes (e.g., converts to analog, filters, amplifies, and frequency upconverts) an OFDM symbol stream from FL TX processor 1082 to generate a forward link signal, which is transmitted from an antenna 1052.

At terminal 120x, the forward link signals from the base stations are received by an antenna 1020 and processed by a receiver unit (RCVR) 1034 to obtain data samples. A forward link receive (FL RX) processor 1036 searches for pilots from different sectors and measures each detected pilot. A controller 1030 receives the pilot measurements, selects the serving sector, identifies strong non-serving sectors, and forms a reuse set for terminal 120x. Terminal 120x then sends the reuse set to serving base station 110x via over-the-air signaling. Base station 110x determines a restricted set for terminal 120x based on its reuse set, assigns subbands from the restricted set to terminal 120x, sends the subband assignment via the forward link to terminal 120x, and also forwards the subband assignment to non-serving base station 110y.

For data transmission on the reverse link, at terminal 120x, an encoder/modulator 1012 receives and processes (e.g., encodes, interleaves, and modulates) traffic/packet data and generates data symbols, which are modulation symbols for data. Each modulation symbol is a complex value for a point in a signal constellation for a selected modulation scheme. A symbol-to-subband mapping unit 1014 maps the data symbols onto the subbands assigned to terminal 120x. The assigned subbands may be indicated by an FH sequence for a traffic channel assigned to terminal 120x. Mapping unit 1014 also maps pilot symbols onto subbands used for pilot transmission and a signal value of zero for each subband not used for pilot or data transmission. For each OFDM symbol period, mapping unit 1014 provides N transmit symbols for the N total subbands, where each transmit symbol may be a data symbol, a pilot symbol, or a zero-signal value.

An OFDM modulator (Mod) 1016 receives N transmit symbols for each OFDM symbol period and generates a corresponding OFDM symbol. OFDM modulator 1016 typically includes an inverse fast Fourier transform (IFFT) unit and a cyclic prefix generator. For each OFDM symbol period, the IFFT unit transforms the N transmit symbols to the time domain using an N-point inverse FFT to obtain a "transformed" symbol that contains N time-domain chips. Each chip is a complex value to be transmitted in one chip period. The cyclic prefix generator then repeats a portion of each transformed symbol to form an OFDM symbol that contains N+C chips, where C is the number of chips being repeated. The repeated portion is often called a cyclic prefix and is used to combat inter-symbol interference (ISI) caused by frequency selective fading. An OFDM symbol period corresponds to the duration of one OFDM symbol, which is N+C chip periods. OFDM modulator 1016 provides a stream of OFDM symbols. A transmitter unit 1018 processes the OFDM symbol stream to generate a reverse link signal, which is transmitted from antenna 1020.

At serving base station 110x, the reverse link signal from terminal 120x as well as the reverse link signals from other terminals are received by antenna 1052x, and the received signal is provided to and processed by a receiver unit 1054x to obtain data samples. An OFDM demodulator (Demod) 1056x processes the data samples and provides received symbols, which are noisy estimates of the transmit symbols sent by the terminals. A symbol-to-subband demapping unit 1058x obtains the N received symbols for each OFDM symbol period and provides received symbols for the subbands assigned to terminal 120x. A demodulator/decoder 1060x performs data detection on the received symbols for terminal 120x with a channel estimate for terminal 120x to obtain soft-decision symbols. For soft handoff and if base stations 110x and 110y are co-located, demodulator 1060x may also receive soft-decision symbols for terminal 120x from base station 110y and may combine the soft-decision symbols from base stations 110x and 110y. Decoder 1060x then deinterleaves and decodes the (combined or uncombined) soft-decision symbols and provides decoded data for terminal 120x.

Non-serving base station 110y receives and processes the reverse link signal from terminal 120x in similar manner as serving base station 110x. Base station 110y sends the soft-decision symbols for terminal 120x to base station 110x if these base stations are co-located. Base station 110y performs decoding for terminal 120x and forwards decoded packets to base station 110x or some other network entity if these base stations are not co-located. The decoded packets from base stations 110x and 110y are selectively combined to obtain the final decoded packets for terminal 120x.

Controllers 1030, 1070x, and 1070y direct the operation at terminal 110x and base stations 110x and 110y, respectively. Memory units 1032, 1072x, and 1072y store program codes and data used by controllers 1030, 1070x, and 1070y, respectively. Controller 1030 may perform or direct the processing for process 600 in FIG. 6 and process 800 in FIG. 8. Controller 1070x may perform process 700 in FIG. 7. Base stations 110x and 110y may both perform process 900 in FIG. 9.

Soft handoff with restrictive reuse may be implemented by various means, e.g., in hardware, software, or a combination thereof. For a hardware implementation, the processing units used to support soft handoff with restrictive reuse at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to support soft handoff with restrictive reuse at a wireless terminal may also be implemented within one or more ASICs, DSPs, and so on.

For a software implementation, soft handoff with restrictive reuse may be implemented with modules (e.g., procedures, functions, and so on) that perform the functions described herein. The software codes may be stored in a memory unit (e.g., memory unit 1032, 1072x, or 1072y in FIG. 10) and executed by a processor (e.g., controller 1030, 1070x, or 1070y in FIG. 10). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of allocating frequency subbands to support soft handoff in a wireless communication system, comprising:
    ascertaining a serving sector and at least one non-serving sector for a wireless terminal, the serving sector being a sector with which the terminal communicates, and each non-serving sector being a sector potentially receiving high interference from the terminal on a reverse link;
    determining a restricted set of frequency subbands based on the serving sector and the at least one non-serving sector, the frequency subbands in the restricted set being allocable to the terminal for data transmission; and
    assigning the terminal with at least one frequency subband selected from the restricted set for data transmission on the reverse link.

2. The method of claim 1, wherein the determining the restricted set of frequency subbands comprises
    forming the restricted set based on a usable set of frequency subbands for the serving sector and a forbidden set of frequency subbands for each of the at least one non-serving sector, the frequency subbands in the usable set being allocable to terminals in communication with the serving sector, and the frequency subbands in the forbidden set for each non-serving sector being unusable by terminals in communication with the non-serving sector.

3. The method of claim 2, wherein the restricted set is formed based on an intersection set operation between the usable set for the serving sector and the forbidden set for each of the at least one non-serving sector.

4. The method of claim 1, wherein the determining the restricted set of frequency subbands comprises
    forming the restricted set based on a usable set of frequency subbands for the serving sector and a limited use set of frequency subbands for each of the at least one non-serving sector, the frequency subbands in the usable set being allocable to terminals in communication with the serving sector, and the frequency subbands in the limited use set for each non-serving sector being usable by terminals in communication with the non-serving sector and having a lower transmit power limit.

5. The method of claim 1, wherein the serving sector and the at least one non-serving sector are ascertained based on pilot measurements for sectors received by the terminal.

6. An apparatus in a wireless communication system, comprising:
    a controller operable to
    ascertain a serving sector and at least one non-serving sector for a wireless terminal, the serving sector being a sector with which the terminal communicates, and each non-serving sector being a sector potentially receiving high interference from the terminal on a reverse link,
    determine a restricted set of frequency subbands based on the serving sector and the at least one non-serving sector, the frequency subbands in the restricted set being allocable to the terminal for data transmission, and
    assign the terminal with at least one frequency subband selected from the restricted set for data transmission on the reverse link.

7. The apparatus of claim 6, wherein the controller is operable to form the restricted set based on a usable set of frequency subbands for the serving sector and a forbidden set of frequency subbands for each of the at least one non-serving sector, the frequency subbands in the usable set being allocable to terminals in communication with the serving sector, and the frequency subbands in the forbidden set for each non-serving sector being unusable by terminals in communication with the non-serving sector.

8. The apparatus of claim 6, wherein the serving sector and the at least one non-serving sector are ascertained based on pilot measurements for sectors received by the terminal.

9. The apparatus of claim 6, wherein the wireless communication system utilizes orthogonal frequency division multiplexing (OFDM).

10. The apparatus of claim 6, wherein the wireless communication system is an orthogonal frequency division multiple access (OFDMA) system utilizing frequency hopping.

11. An apparatus in a wireless communication system, comprising:
    means for ascertaining a serving sector and at least one non-serving sector for a wireless terminal, the serving sector being a sector with which the terminal communicates, and each non-serving sector being a sector potentially receiving high interference from the terminal on a reverse link;
    means for determining a restricted set of frequency subbands based on the serving sector and the at least one non-serving sector, the frequency subbands in the restricted set being allocable to the terminal for data transmission; and
    means for assigning the terminal with at least one frequency subband selected from the restricted set for data transmission on the reverse link.

12. The apparatus of claim 11, wherein the means for determining the restricted set of frequency subbands comprises
    means for forming the restricted set based on a usable set of frequency subbands for the serving sector and a forbidden set of frequency subbands for each of the at least one non-serving sector, the frequency subbands in the usable set being allocable to terminals in communication with the serving sector, and the frequency subbands in the forbidden set for each non-serving sector being unusable by terminals in communication with the non-serving sector.

13. The apparatus of claim 11, wherein the serving sector and the at least one non-serving sector are ascertained based on pilot measurements for sectors received by the terminal.

14. A method of receiving a data transmission from a wireless terminal in a wireless communication system, comprising:

obtaining a received signal having a reverse link signal transmitted by the terminal, the terminal being assigned at least one frequency subband selected from a restricted set of frequency subbands, wherein the restricted set of frequency subbands are determined based on a serving sector and at least one non-serving sector for the terminal, the serving sector being a sector with which the terminal communicates, and each non-serving sector being a sector potentially receiving high interference from the terminal;

processing the received signal to obtain soft-decision symbols for the at least one frequency subband assigned to the terminal; and decoding the soft-decision symbols to obtain decoded data for the terminal.

15. The method of claim 14, wherein the restricted set is formed based on a usable set of frequency subbands for the serving sector and a forbidden set of frequency subbands for each of the at least one non-serving sector, the frequency subbands in the usable set being allocable to terminals in communication with the serving sector, and the frequency subbands in the forbidden set for each non-serving sector being unusable by terminals in communication with the non-serving sector.

16. The method of claim 14, further comprising:

receiving soft-decision symbols obtained by the at least one non-serving sector for the terminal; and combining the soft-decision symbols obtained by the serving sector with the soft-decision symbols obtained by the at least one non-serving sector, and wherein the combined soft-decision symbols are decoded to obtain the decoded data for the terminal.

17. The method of claim 16, further comprising:

estimating interference level for a group of frequency subbands containing the at least one subband assigned to the terminal; and determining whether to combine the soft-decision symbols obtained by the serving and non-serving sectors based on the estimated interference level.

18. The method of claim 14, further comprising:

receiving decoded data obtained by the at least one non-serving sector for the terminal; and combining the decoded data obtained by the serving sector and the decoded data obtained by the at least one non-serving sector to obtain output decoded data for the terminal.

19. The method of claim 18, wherein the combining comprises for each data packet transmitted by the terminal, selecting a correctly decoded data packet for the transmitted data packet from either the serving sector or one of the at least one non-serving sector, if available.

20. The method of claim 14, further comprising:

maintaining an instance of a Radio Link Protocol (RLP) for the terminal at the serving sector and at each of the at least one non-serving sector.

21. An apparatus in a wireless communication system, comprising:

a receiver unit operable to process a received signal and provide data samples, the received signal including a reverse link signal transmitted by a wireless terminal assigned with at least one frequency subband selected from a restricted set of frequency subbands, wherein the restricted set of frequency subbands are determined based on a serving sector and at least one non-serving sector for the terminal, the serving sector being a sector with which the terminal communicates, and each non-serving sector being a sector potentially receiving high interference from the terminal;

a demodulator operable to process the data samples to obtain soft-decision symbols for the at least one frequency subband assigned to the terminal; and a decoder operable to decode the soft-decision symbols to obtain decoded data for the terminal.

22. The apparatus of claim 21, wherein the decoder is further operable to receive soft-decision symbols obtained by the at least one non-serving sector for the terminal, combine the soft-decision symbols obtained by the serving sector with the soft-decision symbols obtained by the at least one non-serving sector, and decode the combined soft-decision symbols to obtain the decoded data for the terminal.

23. The apparatus of claim 21, wherein the decoder is further operable to receive decoded data obtained by the at least one non-serving sector for the terminal and to combine the decoded data obtained by the serving sector and the decoded data obtained by the at least one non-serving sector to obtain output decoded data for the terminal.

24. An apparatus in a wireless communication system, comprising:

means for obtaining a received signal having a reverse link signal transmitted by a wireless terminal, the terminal being assigned at least one frequency subband selected from a restricted set of frequency subbands, wherein the restricted set of frequency subbands are determined based on a serving sector and at least one non-serving sector for the terminal, the serving sector being a sector with which the terminal communicates, and each non-serving sector being a sector potentially receiving high interference from the terminal;

means for processing the received signal to obtain soft-decision symbols for the at least one frequency subband assigned to the terminal; and means for decoding the soft-decision symbols to obtain decoded data for the terminal.

25. The apparatus of claim 24, further comprising:

means for receiving soft-decision symbols obtained by the at least one non-serving sector for the terminal; and means for combining the soft-decision symbols obtained by the serving sector with the soft-decision symbols obtained by the at least one non-serving sector, and wherein the combined soft-decision symbols are decoded to obtain the decoded data for the terminal.

26. The apparatus of claim 24, further comprising:

means for receiving decoded data obtained by the at least one non-serving sector for the terminal; and means for combining the decoded data obtained by the serving sector and the decoded data obtained by the at least one non-serving sector to obtain output decoded data for the terminal.

27. A method of transmitting data from a wireless terminal in a wireless communication system, comprising:

obtaining an assignment of at least one frequency subband to use for data transmission by the terminal on a reverse link, the at least one frequency subband being selected from a restricted set of frequency subbands, wherein the restricted set of frequency subbands are determined based on a serving sector and at least one non-serving sector for the terminal, the serving sector being a sector with which the terminal communicates, and each non-serving sector being a sector potentially receiving high interference from the terminal on the reverse link;

processing data to generate data symbols; and multiplexing the data symbols onto the at least one frequency subband assigned to the terminal.

28. The method of claim 27, wherein the restricted set is formed based on a usable set of frequency subbands for the serving sector and a forbidden set of frequency subbands for each of the at least one non-serving sector, the frequency subbands in the usable set being allocable to terminals in communication with the serving sector, and the frequency subbands in the forbidden set for each non-serving sector being unusable by terminals in communication with the non-serving sector.

29. The method of claim 27, further comprising:

generating a reverse link signal having the data symbols multiplexed onto the at least one frequency subband assigned to the terminal; and transmitting the reverse link signal to the serving sector and the at least one non-serving sector.

30. The method of claim 27, further comprising:

detecting for pilots transmitted by sectors in the system;

obtaining pilot measurements for detected pilots; and identifying the serving sector and the at least one non-serving sector based on the pilot measurements for the detected pilots.

31. The method of claim 30, further comprising:

comparing the pilot measurements for the detected pilots against a threshold; and adding sectors having pilot measurements that exceed the threshold to a reuse set, and wherein the serving sector and the at least one non-serving sector are selected from the sectors in the reuse set.

32. The method of claim 31, wherein the serving sector is a sector with a strongest pilot measurement among the sectors in the reuse set, and wherein each of the at least one non-serving sector is a remaining sector in the reuse set.

33. The method of claim 27, wherein the serving sector and the at least one non-serving sector are ascertained based on pilot measurements made by the serving and non-serving sectors for the terminal.

34. The method of claim 27, wherein the serving sector and the at least one non-serving sector are ascertained based on a position estimate for the terminal.

35. The method of claim 27, further comprising:

generating a pilot with an orthogonal sequence assigned to the serving sector; and transmitting the pilot on the reverse link.

36. The method of claim 35, wherein the serving sector and the at least one non-serving sector are assigned different orthogonal sequences.

37. The method of claim 27, further comprising:

receiving a frequency hopping sequence assigned to the terminal; and determining the at least one frequency subband for each time interval with data transmission based on the frequency hopping sequence.

38. A wireless terminal in a wireless communication system, comprising:

a controller operable to obtain an assignment of at least one frequency subband to use for data transmission by the terminal on a reverse link, the at least one frequency subband being selected from a restricted set of frequency subbands, wherein the restricted set of frequency subbands are determined based on a serving sector and at least one non-serving sector for the terminal, the serving sector being a sector with which the terminal communicates, and each non-serving sector being a sector potentially receiving high interference from the terminal on the reverse link;

a transmit processor operable to process data to generate data symbols; and a multiplexer operable to multiplex the data symbols onto the at least one frequency subband assigned to the terminal.

39. The apparatus of claim 38, further comprising:

a receive processor operable to detect for pilots transmitted by sectors in the system and obtain pilot measurements for detected pilots, and wherein the controller is further operable to ascertain the serving sector and the at least one non-serving sector based on the pilot measurements for the detected pilots.

40. The apparatus of claim 39, wherein the controller is further operable to compare the pilot measurements for the detected pilots against a threshold, add sectors having pilot measurements that exceed the threshold to a reuse set, and select the serving sector and the at least one non-serving sector from the sectors in the reuse set.

41. The apparatus of claim 38, wherein the controller is further operable to receive a frequency hopping sequence assigned to the terminal and to determine the at least one frequency subband for each time interval with data transmission based on the frequency hopping sequence.

42. A wireless terminal in a wireless communication system, comprising:

means for obtaining an assignment of at least one frequency subband to use for data transmission by the terminal on a reverse link, the at least one frequency subband being selected from a restricted set of frequency subbands, wherein the restricted set of frequency subbands are determined based on a serving sector and at least one non-serving sector for the terminal, the serving sector being a sector with which the terminal communicates, and each non-serving sector being a sector potentially receiving high interference from the terminal on the reverse link;

means for processing data to generate data symbols; and means for multiplexing the data symbols onto the at least one frequency subband assigned to the terminal.

43. The terminal of claim 42, further comprising:

means for detecting for pilots transmitted by sectors in the system;

means for obtaining pilot measurements for detected pilots; and means for identifying the serving sector and the at least one non-serving sector based on the pilot measurements for the detected pilots.

44. The terminal of claim 43, further comprising:

means for comparing the pilot measurements for the detected pilots against a threshold; and means for adding sectors having pilot measurements that exceed the threshold to a reuse set, and wherein the serving sector and the at least one non-serving sector are selected from the sectors in the reuse set.

45. The terminal of claim 42, further comprising:

means for receiving a frequency hopping sequence assigned to the terminal; and means for determining the at least one frequency subband for each time interval with data transmission based on the frequency hopping sequence.

46. A computer readable medium comprising executable codes, which, when executed by a processor, cause the processor:
　　to ascertain a serving sector and at least one non-serving sector for a wireless terminal, the serving sector being a sector with which the terminal communicates, and each non-serving sector being a sector potentially receiving high interference from the terminal on a reverse link;
　　to determine a restricted set of frequency subbands based on the serving sector and the at least one non-serving sector, the frequency subbands in the restricted set being allocable to the terminal for data transmission; and
　　to assign the terminal with at least one frequency subband selected from the restricted set for data transmission on the reverse link.

47. The computer readable medium of claim 46, further comprising codes for causing the processor to form the restricted set based on a usable set of frequency subbands for the serving sector and a forbidden set of frequency subbands for each of the at least one non-serving sector, the frequency subbands in the usable set being allocable to terminals in communication with the serving sector, and the frequency subbands in the forbidden set for each non-serving sector being unusable by terminals in communication with the non-serving sector.

48. The computer readable medium of claim 46, further comprising codes for causing the processor to form the restricted set based on a usable set of frequency subbands for the serving sector and a limited use set of frequency subbands for each of the at least one non-serving sector, the frequency subbands in the usable set being allocable to terminals in communication with the serving sector, and the frequency subbands in the limited use set for each non-serving sector being usable by terminals in communication with the non-serving sector and having a lower transmit power limit.

49. The computer readable medium of claim 47, wherein the restricted set is formed based on an intersection set operation between the usable set for the serving sector and the forbidden set for each of the at least one non-serving sector.

50. The computer readable medium of claim 46, wherein the serving sector and the at least one non-serving sector are ascertained based on pilot measurements for sectors received by the terminal.

51. A computer readable medium comprising executable codes, which, when executed by a processor, cause the processor:
　　to obtain a received signal having a reverse link signal transmitted by the terminal, the terminal being assigned at least one frequency subband selected from a restricted set of frequency subbands, wherein the restricted set of frequency subbands are determined based on a serving sector and at least one non-serving sector for the terminal, the serving sector being a sector with which the terminal communicates, and each non-serving sector being a sector potentially receiving high interference from the terminal;
　　to process the received signal to obtain soft-decision symbols for the at least one frequency subband assigned to the terminal; and
　　to decode the soft-decision symbols to obtain decoded data for the terminal.

52. The computer readable medium of claim 51, wherein the restricted set is formed based on a usable set of frequency subbands for the serving sector and a forbidden set of frequency subbands for each of the at least one non-serving sector, the frequency subbands in the usable set being allocable to terminals in communication with the serving sector, and the frequency subbands in the forbidden set for each non-serving sector being unusable by terminals in communication with the non-serving sector.

53. The computer readable medium of claim 51, further comprising:
　　codes for causing the processor to receive soft-decision symbols obtained by the at least one non-serving sector for the terminal; and
　　codes for causing the processor to combine the soft-decision symbols obtained by the serving sector with the soft-decision symbols obtained by the at least one non-serving sector, and wherein the combined soft-decision symbols are decoded to obtain the decoded data for the terminal.

54. The computer readable medium of claim 53, further comprising:
　　codes for causing the processor to estimate interference level for a group of frequency subbands containing the at least one subband assigned to the terminal; and
　　codes for causing the processor to determine whether to combine the soft-decision symbols obtained by the serving and non-serving sectors based on the estimated interference level.

55. The computer readable medium of claim 51, further comprising:
　　codes for causing the processor to receive decoded data obtained by the at least one non-serving sector for the terminal; and
　　codes for causing the processor to combine the decoded data obtained by the serving sector and the decoded data obtained by the at least one non-serving sector to obtain output decoded data for the terminal.

56. The computer readable medium of claim 55, further comprising:
　　for each data packet transmitted by the terminal, codes for causing the processor to select a correctly decoded data packet for the transmitted data packet from either the serving sector or one of the at least one non-serving sector, if available.

57. The computer readable medium of claim 51, further comprising:
　　codes for causing the processor to maintain an instance of a Radio Link Protocol (RLP) for the terminal at the serving sector and at each of the at least one non-serving sector.

58. A computer readable medium comprising executable codes, which, when executed by a processor, cause the processor:
　　to obtain an assignment of at least one frequency subband to use for data transmission by the terminal on a reverse link, the at least one frequency subband being selected from a restricted set of frequency subbands, wherein the restricted set of frequency subbands are determined based on a serving sector and at least one non-serving sector for the terminal, the serving sector being a sector with which the terminal communicates, and each non-serving sector being a sector potentially receiving high interference from the terminal on the reverse link;
　　to process data to generate data symbols; and
　　to multiplex the data symbols onto the at least one frequency subband assigned to the terminal.

59. The computer readable medium of claim 58, wherein the restricted set is formed based on a usable set of frequency subbands for the serving sector and a forbidden set of frequency subbands for each of the at least one non-serving sector, the frequency subbands in the usable set being allocable to terminals in communication with the serving sector, and the frequency subbands in the forbidden set for each non-serving sector being unusable by terminals in communication with the non-serving sector.

60. The computer readable medium of claim 58, further comprising:
   codes for causing the processor to generate a reverse link signal having the data symbols multiplexed onto the at least one frequency subband assigned to the terminal; and
   codes for causing the processor to transmit the reverse link signal to the serving sector and the at least one non-serving sector.

61. The computer readable medium of claim 58, further comprising:
   codes for causing the processor to detect for pilots transmitted by sectors in the system;
   codes for causing the processor to obtain pilot measurements for detected pilots; and
   codes for causing the processor to identify the serving sector and the at least one non-serving sector based on the pilot measurements for the detected pilots.

62. The computer readable medium of claim 61, further comprising:
   codes for causing the processor to compare the pilot measurements for the detected pilots against a threshold; and
   codes for causing the processor to add sectors having pilot measurements that exceed the threshold to a reuse set, and wherein the serving sector and the at least one non-serving sector are selected from the sectors in the reuse set.

63. The computer readable medium of claim 62, wherein the serving sector is a sector with a strongest pilot measurement among the sectors in the reuse set, and wherein each of the at least one non-serving sector is a remaining sector in the reuse set.

64. The computer readable medium of claim 58, wherein the serving sector and the at least one non-serving sector are ascertained based on pilot measurements made by the serving and non-serving sectors for the terminal.

65. The computer readable medium of claim 58, wherein the serving sector and the at least one non-serving sector are ascertained based on a position estimate for the terminal.

66. The computer readable medium of claim 58, further comprising:
   codes for causing the processor to generate a pilot with an orthogonal sequence assigned to the serving sector; and
   codes for causing the processor to transmit the pilot on the reverse link.

67. The computer readable medium of claim 66, wherein the serving sector and the at least one non-serving sector are assigned different orthogonal sequences.

68. The computer readable medium of claim 58, further comprising:
   codes for causing the processor to receive a frequency hopping sequence assigned to the terminal; and
   codes for causing the processor to determine the at least one frequency subband for each time interval with data transmission based on the frequency hopping sequence.

* * * * *